United States Patent Office 2,806,061
Patented Sept. 10, 1957

2,806,061

CARBOXYLIC ACID CHLORIDES

James C. Wygant, Dayton, Ohio, assignor to Monsanto Chemical Company, St. Louis, Mo., a corporation of Delaware No Drawing. Application June 22, 1955,
Serial No. 517,355

5 Claims. (Cl. 260—544)

This invention relates to a new method of preparing acid chlorides.

It has been known hitherto to prepare carboxylic acid chlorides by the treatment of the corresponding acid with inorganic acid chlorides e. g., phosphorus pentachloride, thionyl chloride, etc. This method suffers, however, from the disadvantage that it must be operated in the complete absence of moisture, and therefore research has been directed to the discovery of alternative and less sensitive procedures. A reagent of particular interest as a halogenating agent in the synthesis of acid chlorides is the insensitive and relatively inert compound, carbon tetrachloride. It has accordingly been proposed to prepare acid chlorides by the catalyzed reaction of carbon tetrachloride, for example, with carboxylic acid anhydrides in the presence of zinc chloride, e. g., as described in U. S. 2,051,096, to J. R. Mares. More recently, it has been proposed, in U. S. 2,700,679 to Carnahan et al., to react carbon tetrachloride with carboxylic acids in the presence of certain catalysts such as oxides of molybdenum, tungsten, silicon and aluminum. Both of these methods suffer from the disadvantage of requiring special catalysts to cause the desired formation of acid chlorides to take place.

I have now made the surprising discovery that carboxylic acid chlorides can be prepared in the absence of a catalyst, by the reaction of an alkyl polychloride with the salt of a carboxylic acid.

The alkyl polychlorides employed in the process of the present invention are preferably lower alkyl polychlorides which are incapable of splitting out hydrogen chloride under the conditions of the present process. Useful polychlorides include the polychloromethanes, i. e., carbon tetrachloride, chloroform, and methylene chloride, and the perchlorinated lower alkanes containing more than one carbon atom, e. g., hexachloroethane, octachloropropane, etc.

The carboxylic acid salts useful in the present method of synthesis of acid chlorides comprise the alkali metal salts of aliphatic, araliphatic, aromatic, alkylaromatic and cycloaliphatic mono- and polycarboxylic acids of from 2 to 20 carbon atoms. The aliphatic carboxylic acid salts which undergo the present reaction include the alkali metal salts of branched and unbranched, unsaturated and saturated fatty acids, e. g., sodium acetate, sodium propionate, potassium propionate, sodium butyrate, sodium isovalerate, potassium hexanoate, rubidium 3-methylhexanoate, sodium nonanoate, sodium decanoate, potassium octadecanoate, sodium isododecanoate, sodium 5-butyldecanoate, etc.; sodium acrylate, sodium 3-methyl-2-butenoate, potassium 4-pentenoate, sodium 10-undecylenoate, sodium oleate, lithium sorbate, sodium linoleate, sodium eleostearate, etc. Other monocarboxylate salts useful in the present reaction include araliphatic acid salts, such as sodium phenylacetate, sodium cinnamate, sodium hydrocinnamate, etc.; aromatic and alkylaromatic acid salts such as sodium benzoate, sodium 1-naphthoate, sodium m-toluate, potassium p-isopropylbenzoate, sodium p-2-methylallylbenzoate, etc.; and cycloaliphatic acids such as sodium cyclohexanecarboxylate, sodium naphthenates, etc.

Also useful in the present reaction are the alkali metal salts of dicarboxylic acids, saturated or unsaturated, cyclic or acyclic, in which both carboxylic functional groups are present in the form of carboxylate salt groups. As examples of such dicarboxylic acid salts may be mentioned, e. g., potassium oxalate, sodium succinate, sodium adipate; sodium fumarate, lithium itaconate, sodium glutaconate; sodium phthalate, sodium terephthalate, sodium naphthalate, potassium isophthalate, etc.

In carrying out the present reaction, I simply contact the carboxylic acid salt with the polychlorinated alkane in the liquid phase at elevated temperatures, until reaction is complete. I have found that reaction generally takes place at a practicable rate at temperatures above 100° C.; preferably temperatures of 175° C. and above are employed, depending on the reactants. At such temperatures, which are generally above the atmospheric boiling points of the polychlorinated hydrocarbons useful in the present process, in order to maintain a liquid phase in which reaction may take place, the reactants must be confined under pressure; generally, the preferred reaction conditions may be accomplished by confining the reactants in an enclosed vessel under autogenous pressure while heat is applied. It will be appreciated by those skilled in the art that, to avoid loss of reactants to a vapor phase, temperatures applied must not be so high as to bring the lower-boiling reactant above its critical point; the maximum preferred temperatures in the present process are generally about 300° C., and preferably about 250° C.

The proportions of carboxylic acid salt and polychlorinated alkane are not critical, though in general, for convenience in maintaining a liquid phase in the reactor, the use of an excess of the polychlorinated alkane may be found desirable. The preferred molar ratio of polychlorinated alkane to carboxylic acid salt is at least 1:1; yields of the acid chloride product fall off at lower ratios. Unreacted polychlorinated alkane may be readily removed at the close of the reaction, e. g., by distillation; the unreacted polychloro compound may then be recycled for reuse, if desired. Addition of a solvent, such as a high-boiling aliphatic hydrocarbon, e. g., kerosene, to the reactants, is an alternative and usually less preferable mode of procedure.

The process of this invention may be conducted as a batch operation, or it may be operated continuously.

Reaction is ordinarily complete within a few hours, depending on the reactants. Generally, maximum yields with a feasible reaction time are obtained within from 4 to 24 hours, the shorter reaction periods being satisfactory at higher temperatures. When reaction is complete, the reaction vessel may be vented to remove any gases present; phosgene, hydrogen chloride, etc., may be formed as by-products of the present reaction. Unreacted starting material is then separated, as by filtration, distillation, or other means, and the desired acid chloride is separated from any residue, e. g., by distillation, extraction, etc.

The invention is further illustrated, but not limited, by the following examples:

Example 1

A mixture of 50 grams (0.312 mole) of potassium-benzoate and 200 ml. of carbon tetrachloride, was placed in a 1-liter steel autoclave, nitrogen was bubbled through the mixture for a few minutes, and the autoclave was then sealed and placed in a rocking device. With constant agitation, the reactor contents were then held at a temperature of 250° C., under autogenous pressure for five and a half hours, after which the reactor was cooled overnight. After the phosgene present had been vented, the reactor contents were extracted with 500 ml. of carbon tetrachloride and the carbon tetrachloride solution was distilled to remove the solvent. The residue was then distilled under reduced pressure, giving 34.2 grams of benzoyl chloride (78 percent yield).

*Example 2*

A charge consisting of 25 grams (0.18 mole) of sodium hexanoate and 125 ml. (1.3 moles) of carbon tetrachloride was placed in a 300 ml. bomb which was closed and rocked while it was heated at 200° C. for 6 hours. The bomb was cooled and vented, and the contents rinsed out with carbon tetrachloride. After a preliminary distillation to remove solvent, distillation of the residue from the carbon tetrachloride solution yielded 3.7 grams of hexanoyl chloride, identified as the amide (conversion by treatment with ammonia in benzene solution), m. 97–99° C. (from hexane), analyzing as follows:

|  | Found | Calculated for $C_6H_{13}NO$ |
| --- | --- | --- |
| Percent C | 62.54 | 62.57 |
| Percent H | 11.17 | 11.37 |
| Percent N | 12.30 | 12.15 |

The nature of the present invention having been thus fully set forth, and specific examples of the same given, what is claimed is:

1. A process which comprises contacting an alkali metal salt of a carboxylic acid of from 2 to 20 carbon atoms with a lower alkyl polychloride containing from 1 to 3 carbon atoms and incapable of cleaving out hydrogen chloride under the reaction conditions, in the liquid phase in the absence of added catalyst, and isolating from the reaction product a carboxylic acid chloride.

2. The process of claim 1, wherein the said alkali metal salt of a carboxylic acid is contacted with the said alkyl polychloride at a temperature in the range of 100° to 300° C., preferably 175° to 250° C., under autogenous pressure.

3. The process of claim 2, wherein the said alkyl polychloride is carbon tetrachloride.

4. The process which comprises contacting potassium benzoate with carbon tetrachloride in the liquid phase under autogenous pressure at a temperature in the range of 225° to 275° C. in the absence of added catalyst, and isolating benzoyl chloride from the reaction product.

5. The process which comprises contacting sodium hexanoate with carbon tetrachloride in the liquid phase under autogenous pressure at a temperature in the range of from 150° to 250° C. in the absence of added catalyst, and isolating hexanoyl chloride from the reaction product.

References Cited in the file of this patent

UNITED STATES PATENTS

| 2,051,096 | Mares et al. | Aug. 18, 1936 |
| 2,700,679 | Carnahan et al. | Jan. 25, 1955 |